US005812410A

United States Patent [19]
Lion et al.

[11] Patent Number: 5,812,410
[45] Date of Patent: Sep. 22, 1998

[54] SYSTEM FOR DISPENSING DRUGS

[75] Inventors: Nicholas Lion, Princeton, N.J.; Nicholas Kydonieus, West Palm Beach, Fla.

[73] Assignee: RX Excel, Inc., Princeton, N.J.

[21] Appl. No.: 643,628

[22] Filed: May 6, 1996

Related U.S. Application Data

[63] Continuation-in-part of Ser. No. 572,619, Dec. 14, 1995.

[51] Int. Cl.[6] .............................. G06F 17/00; G06G 7/48

[52] U.S. Cl. ................................ 364/479.01; 364/479.13; 364/478.04; 364/478.13; 221/9

[58] Field of Search .......................... 364/479.01, 479.11, 364/479.12, 479.14, 478.04, 478.06, 478.13, 478.16; 235/375; 221/2, 7, 13, 265, 264, 273, 253, 304

[56] References Cited

U.S. PATENT DOCUMENTS

| | | | |
|---|---|---|---|
| 3,885,703 | 5/1975 | Neavin | 221/202 |
| 4,903,861 | 2/1990 | Yuyama | 221/265 |
| 4,984,709 | 1/1991 | Weinstein | 221/7 |
| 5,014,877 | 5/1991 | Roos | 221/265 |
| 5,135,136 | 8/1992 | Moone | 221/304 |
| 5,208,762 | 5/1993 | Charhut et al. . | |
| 5,219,095 | 6/1993 | Shimizu et al. | 221/264 |
| 5,337,919 | 8/1994 | Spaulding et al. . | |
| 5,348,061 | 9/1994 | Riley et al. | 141/104 |
| 5,377,864 | 1/1995 | Blechl et al. | 221/2 |
| 5,597,995 | 1/1997 | Williams et al. | 235/375 |

OTHER PUBLICATIONS

Product brochure—Scriptpro Automated Prescription Dispensing System 4 pages, Published USA 1996.

Product Brochure—The Baker Autoscript II System 8 pages, Publsihed USA 1995.

Product Brochure—Optifill II Automated Prescription Bottle Filler System, Published USA Jun., 1995.

*Primary Examiner*—Joseph Ruggiero
*Assistant Examiner*—Sheela S. Rao
*Attorney, Agent, or Firm*—Brian K. Dincola

[57] ABSTRACT

A prescription dosage unit dispensing system including a housing having a plurality of cells, each cell adapted to contain a base-port subunit including a dosage unit dispensing device, a disposable drug-containing tower unit containing in sealed condition a single type of solid dosage unit is operatively connected to the base-port subunit and a device for securing a vial in place so that it can receive the solid dosage units from the drug-containing tower unit as instructed manually or via automated microprocessor/computer control.

45 Claims, 18 Drawing Sheets

SYSTEM FOR DISPENSING DRUGS

This application is a Continuation-In-Part of application Ser. No. 08/572,619, filed Dec. 14, 1995.

FIELD OF THE INVENTION

The present invention is directed to an integrated system for the dispensing of therapeutic agents e.g. drugs. The system includes a disposable cannister or tower for storing drugs and delivering the drugs to a drug delivery device including a drug dispensing system for manually or automatically dispensing drugs upon a command and for filling and delivering a vial containing the drugs for dispensing by a pharmacist. The drug dispensing system enables a pharmacist to deliver a completed prescription in a cost efficient and effective manner without actually handling the drugs or the containers in which they are stored.

BACKGROUND OF THE INVENTION

The healthcare profession particularly pharmacies, which are principally responsible for delivering prescription drugs to a patient, have undergone significant change over recent years. Years ago the pharmacist was principally responsible for mixing medications and for delivering the mixed medications to customers at a pharmacy. In more recent years, the pharmacist is principally involved in dispensing drugs provided by major pharmaceutical manufacturers. The process of filling a prescription is time consuming and inefficient.

For example, the filling of a prescription is typically performed by first obtaining the prescription from a customer in person or over the telephone from the treating physician's office. The pharmacist then identifies the drug, the dosage and directions for taking the mediation. The customer's record must be reviewed and updated and information obtained therefrom must be placed on the prescription vial or container for housing the drugs.

In pharmacies that have computer systems, the information is stored in a computer and must be accessed so that proper instructions and cross-checks for conflicting medications may be performed. The prescription data is used for labeling the latest prescription as required by law and is entered into the computer printer which produces a label for the prescription vial. Once the label has been printed, the pharmacist proceeds to obtain the drug from the shelf, count the pills, and then place the pills in a suitable prescription vial. Thereafter, the printed label must be affixed to the prescription vial and any additional auxiliary warning labels that may be needed are also placed on the vial.

It is obvious that even for a pharmacy of moderate size, it will be necessary for the pharmacist to spend an inordinate amount of time physically handling and filling a prescription. In addition, a pharmacist spends a significant amount of time dealing with insurance claim issues and counseling of patients regarding the proper use of medications.

With the growing need in the healthcare profession to reduce costs and improve efficiency, efforts have been made to automate and/or reduce the number of tedious steps that must be employed by a pharmacist in the filling of a typical prescription. A variety of tablet counters have been provided which enable the pharmacist to automatically count the number of pills going into a prescription vial. The tablet counter can take a number of forms but is typically based on a sensor which detects the number of tablets passing a particular location to provide an accurate count of the pills as they pass into the prescription vial.

Such machines are disadvantageous because they can become contaminated as residues of pills are left in the counter and are dragged into prescription vials which do not call for that particular type of drug. In addition, there have been problems with the accuracy of tablet counters particularly if pills are broken or if there is a change in the frequency at which the pills fall into the prescription vial.

One such system is disclosed in Johnson et al., U.S. Pat. No. 4,018,358 which stores pills in special storage bins. The proper bin is located and removed from the shelf. The bin is then manually inserted into a counter and then the desired number of pills are entered into the keyboard/keypad associated with the counter. Once the vial has been filled, the bin is then manually removed and reshelved.

While such counters are an improvement over totally manual systems, nonetheless, there is still time and effort that must be provided in manually engaging the drug-containing bins and removing them each time a prescription is filled.

An improvement in systems of the aforementioned type is found in Lerner, U.S. Pat. No. 4,247,019 in which the storage bin is associated with the counter. The keyboard/keypad is used to identify the proper storage bin and to enter the proper number of pills. One of the problems with this system is that the cells are large and occupy a significant amount of shelf space. In addition, the pharmacist must still manually identify and locate proper prescription vials and coordinate the vials with the loading of the drugs therein in order to dispense a prescription.

A more fully automated system is disclosed in Spaulding et al., U.S. Pat. No. 5,337,919. This system is an automated system for filling prescriptions which requires the use of a pharmacy host computer. It is an add-on that requires the pharmacist to have a computer in-house. In addition the pharmacist has to manually fill, update and replenish each of the storage bins housing the prescription drugs. Furthermore, the pharmacist must store and provide prescription vials for a variety of sizes in order to house different size pills for different size prescriptions.

While progress has been made in reducing the amount of time a pharmacist spends filling a prescription, significant improvements are still required. It would be desirable to provide a system in which sealed drug storage bins can be used and drugs dispensed therefrom without contamination and without the use of stand alone counters. It would be a further advantage if the pharmacist could avoid storing prescription vials and handling of the same when filling a prescription.

SUMMARY OF THE INVENTION

The present invention is directed to a prescription dosage unit system in which information contained on a person's prescription for a drug is filled through the use of a disposable drug storing means which stores the drug and transfers the drug to a drug delivery means in response to the information contained within the prescription. The employment of a disposable drug storing means eliminates downtime in refilling storage bins associated with prior art devices.

In preferred aspects of the present invention a unique system is provided for delivering the drug to a prescription vial directly from the disposable drug storing means. In another aspect of the invention, the storage and handling of prescription vials is eliminated through the use of a unique prescription vial construction unit integral with the dosage unit dispensing system.

In another preferred form of the invention, the prescription dosage unit system includes a microprocessor for receiving information including a person's prescription for a drug and for converting said information to a signal. The signal is transmitted to the drug delivery means which activates the drug storing means and thereby automatically releases the correct number of pills from the disposable drug storing means into a prescription vial without physical contact by the pharmacist.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

In accordance with the present invention there is provided a prescription dosage unit system which contains disposable units for storing solid dosage units (e.g. pills, capsules, gelcaps and the like) of a therapeutic agent (e.g. drugs) and the means by which the pills may be dispensed and delivered to the pharmacist as a complete and finished prescription product. This is accomplished without the pharmacist having to physically handle the pills, count the pills to fill the prescription, and/or place the pills within a sealed prescription vial.

Figure 1:
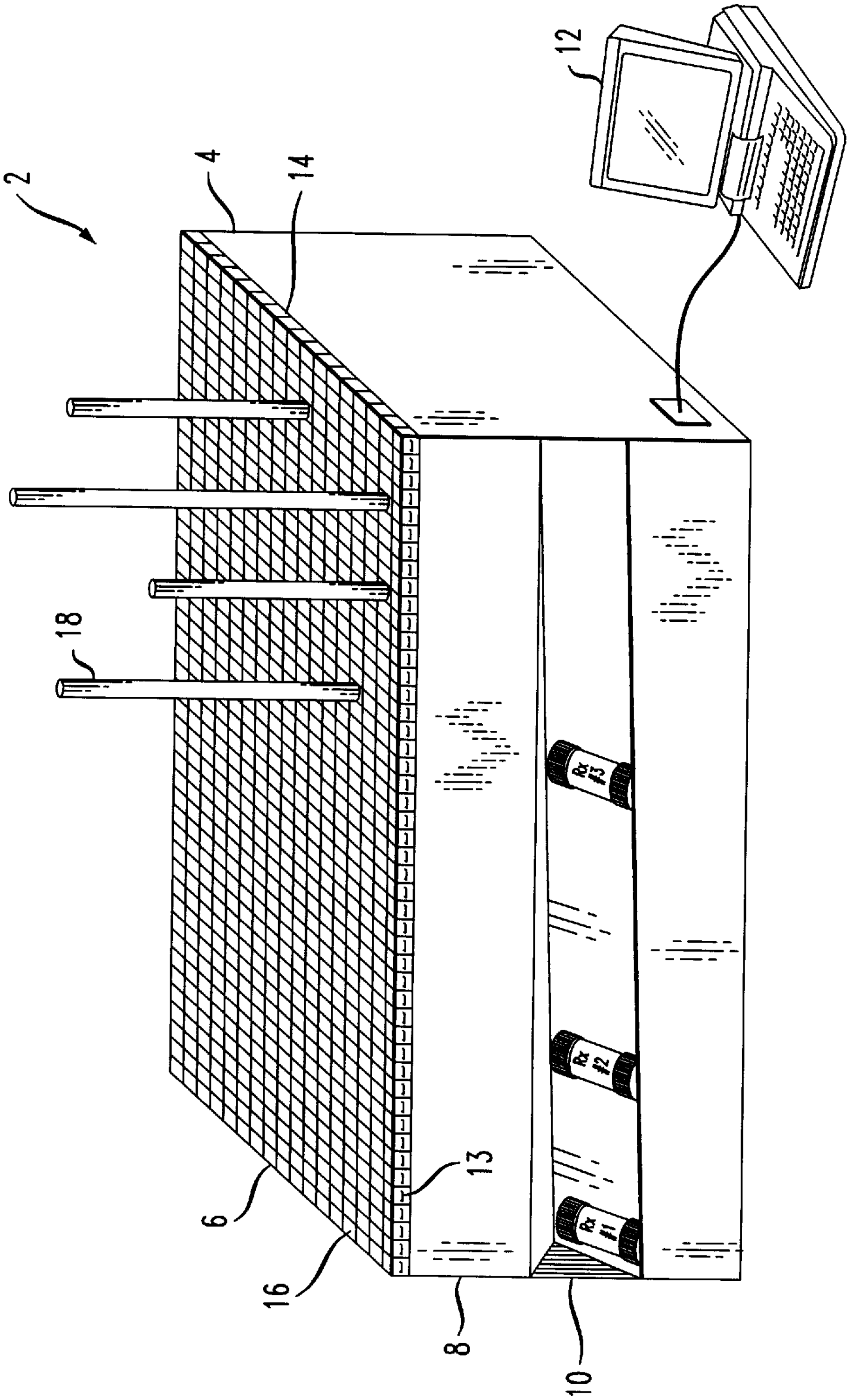
FIG. 1 is a perspective view of an embodiment of the prescription dosage unit system of the present invention.

Referring to FIG. 1, there is shown an embodiment of the prescription dosage unit system of the present invention. The system 2 comprises a housing 4 including a drug storage section 6, a drug delivery section 8 and a sealed prescription vial delivery system 10. The system of the present invention may be manually operated or computerized by connecting the prescription dosage unit system 2 to a suitable microprocessor system 12 as described hereinafter.

Figure 5:
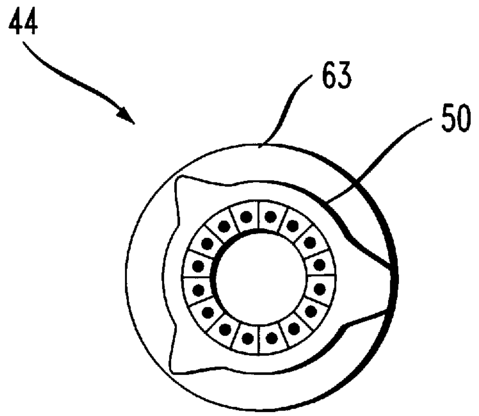
FIG. 5 is a top view of the base-port subunit shown in FIG. 4.
Figure 6:
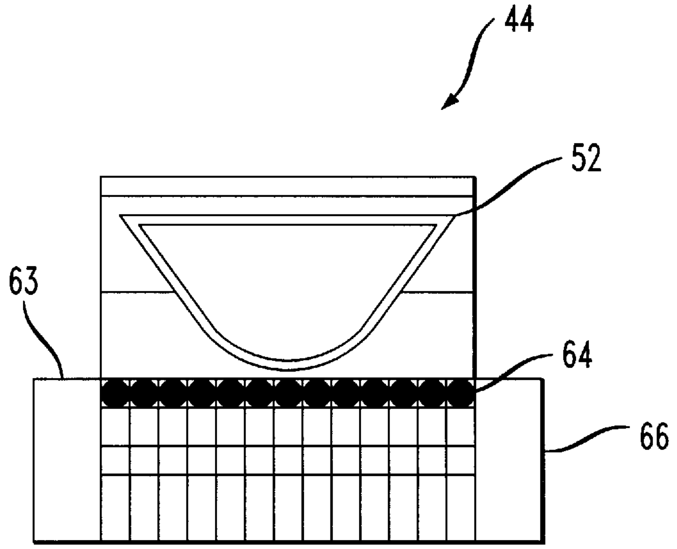
FIG. 6 is a cross-sectional side view of the base-port unit shown in FIG. 4.

The drug storage section 6 includes a platform 14 containing parallel rows of cells 16 each cell adapted to operatively seat a base-port subunit 44 (shown in FIGS. 4, 5 and 6 and as described in detail hereinafter) which is enabled to receive a drug-containing tower unit 18, preferably disposable, in accordance with the present invention and as explained in detail hereinafter. The drug-containing tower unit 18 is sealingly engaged to an appropriate cell 16 through the base-port subunit 44 so that the drug contained therein may be dispensed into a prescription vial. When the drug-containing tower unit 18 is emptied of the drug, it is removed from the platform 14 and disposed of by discarding into a suitable trash receptacle or by returning to the drug manufacturer or distributor for recycling.

Figure 2:
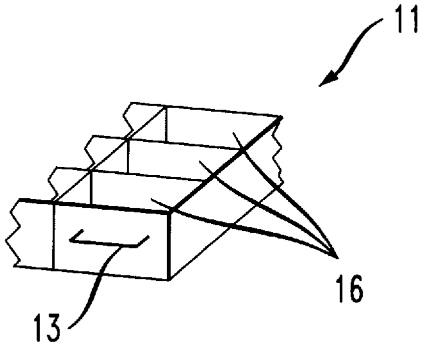
FIG. 2 is a partial perspective view of a drawer containing a plurality of cells for receiving a drug-containing tower unit.

Each parallel row of cells 16 constitutes a drawer 11 as shown in FIG. 2. Each drawer includes a handle 13 and a plurality of individual cells 16, each cell containing an individual base-port subunit 44 into which a drug-containing tower unit 18 is inserted. The drawer 11 can be pulled outwardly from the platform by gripping and pulling on the handle 13.

Figure 3:
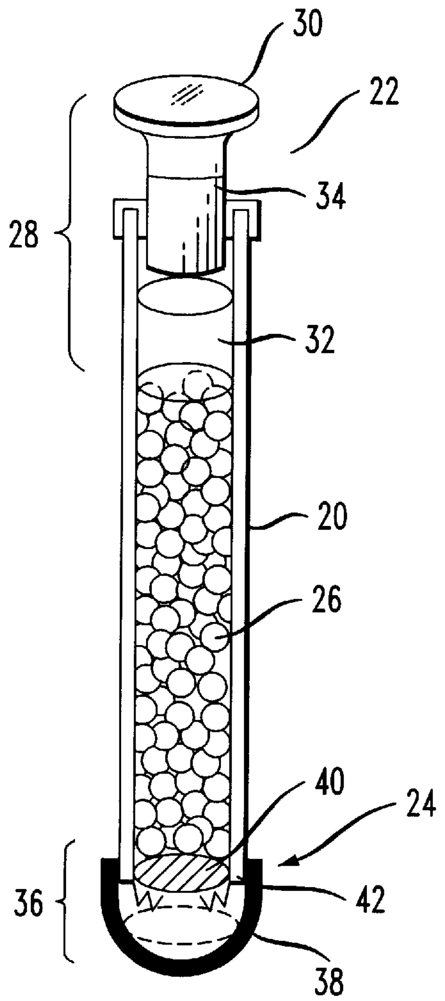
FIG. 3 is a side view of an embodiment of a drug-containing tower unit of the present invention.

As previously indicated, the drug-containing tower unit 18 comes to a pharmacist in sealed condition. Referring to FIG. 3, the drug-containing tower unit 18 is preferably in the form of a cylindrical tube 20 having a top end 22 and a bottom end 24. The tube contains a solid dosage unit of a particular type of therapeutic agent (e.g. a prescription drug). The solid dosage unit can be in the form of tablets, caplets, capsules, gelcaps and the like. For the sake of convenience only, the solid dosage unit form of the drug will be referred to hereinafter as "pills".

The pills 26 are stored in the tube in which the top end 22 is sealed. A sealing device 28 includes a cap 30 which fits into the top end 22. Separating the pills 26 and the cap 30 is a packing plug 32 and another form of packaging which may be, for example, a desiccant 34. Other packaging systems and means for sealing the top end of the tube 20 may be employed and would be apparent to those of ordinary skill in the art.

In accordance with the present invention, the bottom end 24 of the tube 20 is also sealed. The sealing device 36 at the bottom end of the tube is intended to be removed when the drug tower is operational and pills must be dispensed therefrom.

In the embodiment shown in FIG. 3, the bottom end sealing device 36 includes a protective cap 38, a removable barrier layer 40 which may be made of any material which can be easily penetrated and removed when it is necessary to dispense the pills 26 from the tube 20. In a preferred form of the invention, the barrier layer 40 is made of an aluminum foil although thin plastic films may be employed as well, such as polypropylene, polyethylene and mylar. The barrier is penetrated and thereby removed when the upper portion (i.e. unit 50) of the base-port subunit 44 is inserted into the tube 20.

In another embodiment, the removable barrier layer 40 can comprise a three layer construction. Included in this embodiment is a polymer layer made of, for example, polypropylene, polyethylene or mylar having aluminum vapor deposited on a surface thereof. On the aluminum film is attached a layer of paper. The aluminum layer provides a hermetic seal while the paper layer protects the soft aluminum metal from being scratched or prematurely pierced. Additionally, thin layers made of, for example, ethylene vinyl acetate or ethylene acrylic acid may be placed between the three principal layers to improve adhesion of the principal layers and improve the integrity of the removable barrier layer.

Figure 4:
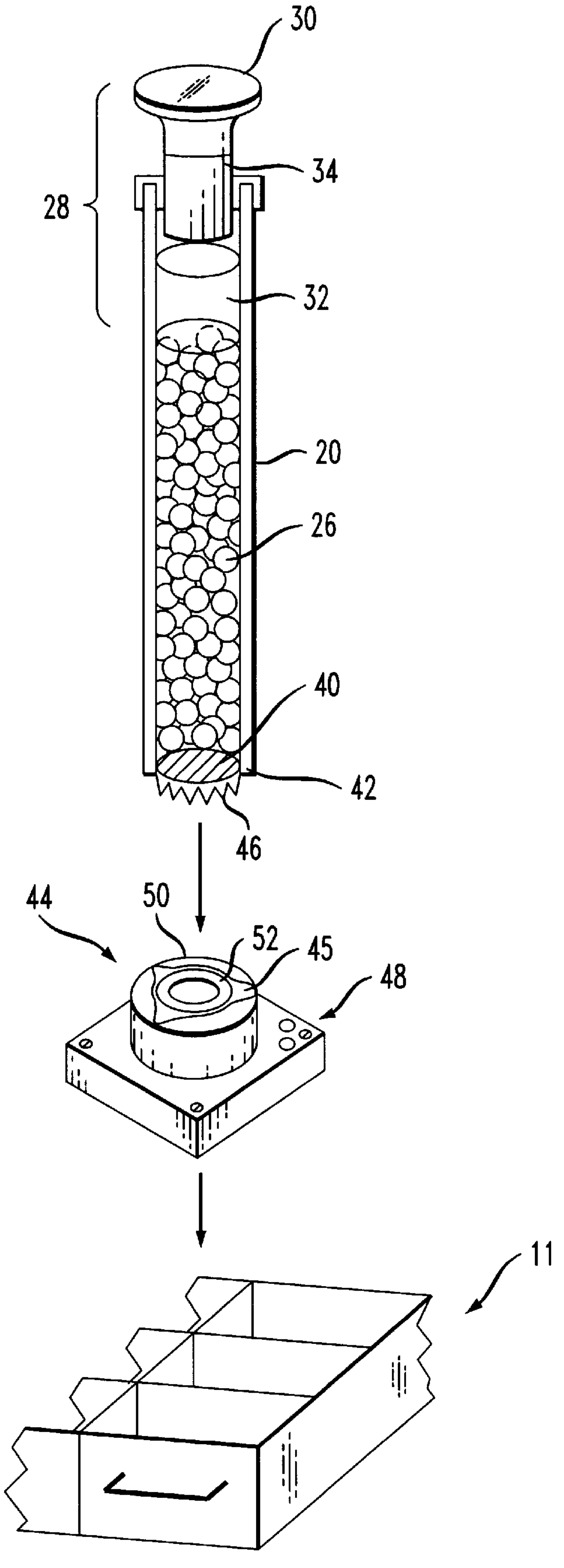
FIG. 4 is an exploded view of a drug-containing tower unit used for storing solid dosage units of a drug, a base-port subunit for receiving the tower unit and a drawer including a cell or compartment for housing the base-port subunit.

FIG. 4 shows the manner in which the drug-containing tower unit is secured within a drawer of the drug storage section. As shown in FIG. 4, an engagement device 42 connects the drug-containing tower unit 18 to a base-port subunit 44 which is positioned within a cell 16 of a drawer 11. The engagement device 42 can be in the form of a projection which engages an indentation in the base-port subunit 44 or can be in the form of a pressure-fitting unit 45 as shown specifically in FIG. 4. What is required is that the drug-containing tower unit 18 be releasably engagable to the base-port subunit 44 contained within the cell 16. When the drug-containing tower unit 18 is emptied of the pills 26, the tower unit 18 is removed from the base-port subunit 44 and replaced with a new unit 18.

The drug-containing tower unit 18 also contains an array of projections 46 which are different for each drug-containing tower unit. The array of projections 46 is adapted to engage corresponding sensors in the base-port subunit 44 to provide valuable information such as NDC numbers, lot number, expiration dates and the like so that each of the drug-containing tower units can be inventoried and the proper drug and amount thereof can be inventoried as explained in detail hereinafter.

The base-port subunit 44 is adapted to releasably engage the drug-containing tower unit 18, to thereby dispense the number of pills of the particular drug which are required for the prescription. The structure of an embodiment of the base-port subunit 44 is shown by reference to FIGS. 4–7B.

The base-port subunit 44 includes a housing 48 containing a unit 50 including a iris aperture 52 which can open or close to allow the pills 26 to enter from the drug-containing tower unit 18 and to shut the flow thereof. The unit 50 therefore provides controlled release of the pills obtained from the drug-containing tower unit 18.

Figure 7A:
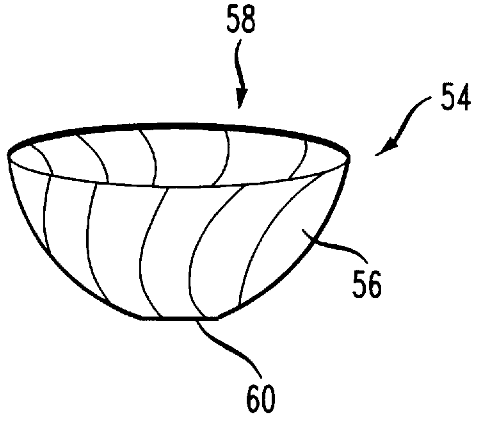
FIG. 7A is a side view of a parabolic iris aperture used to control the dispensing of the drug from the drug-containing tower unit.
Figure 7B:
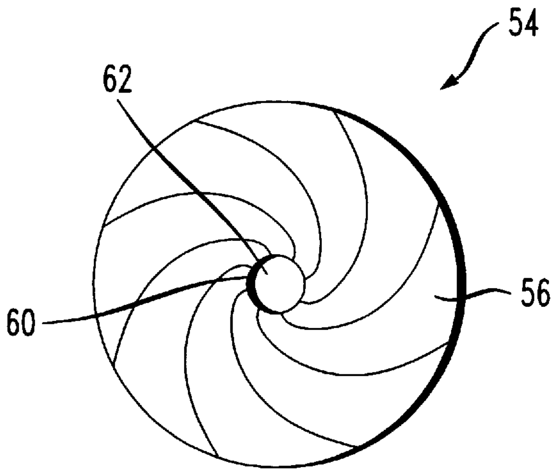
FIG. 7B is a top view of the parabolic iris aperture shown in FIG. 7A.

In a preferred form of the invention as shown in FIGS. 7A and 7B, the iris aperture 52 is in the shape of a bowl 54 comprised of overlapping leaves 56. The top end 58 of the bowl 54 is adapted to receive the pills from the drug-containing tower unit 18. The bottom end 60 is arranged such that movement of the leaves 56 can define an opening 62 which is of sufficient diameter so as to allow at least one pill 26 to drop therethrough at a time.

The leaves 56 defining the bowl 54 are such that they provide a funneling of the pills 26 toward the opening 62. In this way, a controlled movement of the pills through the opening 62 can be achieved to facilitate counting thereof as described hereinafter.

Movement of the leaves 56 to provide an opening 62 and to set the opening 62 at the desired diameter for the pill 26 contained within the drug-containing tower unit 18 can be controlled manually by a cranking mechanism as described hereinafter or automatically through the use of the main microprocessor/computer control 12.

As previously indicated, the drug-containing tower unit 18 is provided with an array of projections 46 adapted to engage and thereby encode information specific to the particular drug-containing tower unit 18 through the arrangement of the projections 46 and their contact with corresponding sensors in the base-port subunit 44. Again referring to FIGS. 5 and 6 the base-port subunit 44 is provided with an array of receptors 63 adapted to be contacted by the projections 46. The presence of a projection 46 for a particular receptor 63 encodes for "on" while the absence of a projection 46 and therefore the lack of contact with a receptor 63 codes for "off". Accordingly, an arrangement of "on" and "off" signals can be generated which can be translated into particular information required for dispensing the pills.

As best shown in FIGS. 5, 6, and 8A–9B, the receptors 63 include ball bearings 64 which remain in a fixed position when untouched by a projection 46 or are moved into a second position in the presence of a projection 46.

Figure 8A:
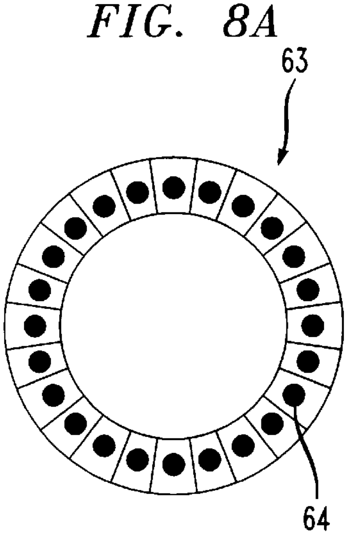
FIG. 8A is a top view of an array of receptors contained within the base-port subunit.
Figure 9A:
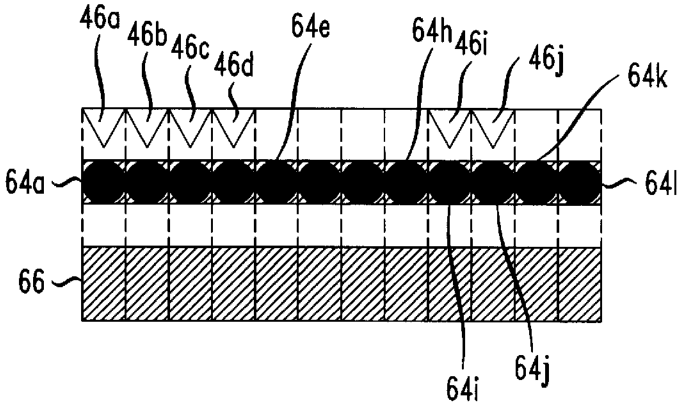
FIG. 9A is a partial schematic view of the array of receptors shown in FIG. 8A.
Figure 8B:
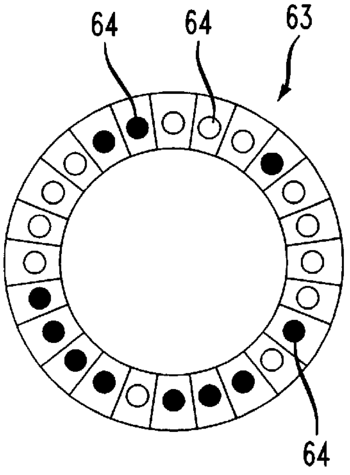
FIG. 8B is a top view of the array of receptors shown in FIG. 8A after contact with an arrangement of projections from a particular drug-containing tower unit.
Figure 9B:
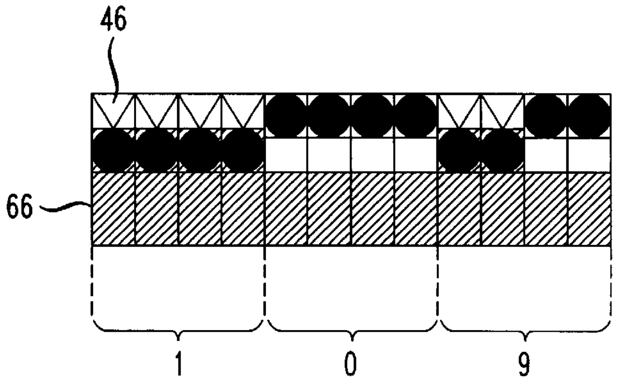
FIG. 9B is a partial schematic view of the array of receptors shown in FIG. 8B.

Reference herein is specifically made to FIGS. 8A, 8B, 9A and 9B to show the interaction of the projections 46 (or lack thereof) and the ball bearings 64. FIGS. 8A and 8B show an arrangement of a series of projections 46 in proximity to but not engaging the ball bearings 64. In particular, FIG. 9A shows an array of consecutively positioned ball bearings from 64*a*–64*l*. Projections 46*a*–46*d* are aligned with ball bearings 64*a*–64*d*. There are no projections aligned with ball bearings 64*e*–64*h*. Two projections 46*i* and 46*j* are aligned with corresponding ball bearings 64*i* and 64*j* while no projections are provided to ball bearings 64*k* and 64*l*. As shown in FIGS. 8B and 9B when the drug-containing tower unit 18 is operatively engaged to the base-port subunit 44, the projections 46*a*–46*d*, 46*i* and 46*j* operatively move corresponding ball bearings 64*a*–64*d*, 64*i* and 64*j* optionally into contact with sensors 66. The ball bearings 64*e*–64*h* and 64*k* and 64*l* remain in their original position because of the lack of contact with corresponding projections 46.

The arrangement of projections can operate as a binary coding system to provide a series of numbers which encode for particular information relevant to the prescription drug such as NDC number, lot number, and the like. The arrangement of the ball bearings and therefore the particular information can be manually observed or employed to transmit a signal corresponding to the designated information to the microprocessor 12. This can be accomplished by providing a sensor 66 which reads the presence or absence of the ball bearings 64 and thereby encodes a signal to the microprocessor through an electrical circuit in a conventional manner.

In the particular embodiment represented by FIGS. 8A–9B, when a ball-bearing 64 is depressed by a corresponding projection 46, then a binary signal of "ON" [symbol=1] is recognized. If a ball-bearing 64 is not depressed by a corresponding projection 46, then a binary signal of "OFF" [symbol=0] is recognized. As shown specifically in FIG. 9B, a binary array of four ball-bearings encodes for a signal numerical digit. The binary arrangement 1111 encodes for the numerical digit 4, the binary arrangement 0000 encodes for the numerical digit 0 and the binary arrangement 1100 encodes for the numerical digit 9.

The arrangement of ball bearings shown in FIGS. 8A and 8B provide for six groups of ball bearings with four ball bearings in each group. This system therefore can encode a six digit number. Numbers containing more digits can be provided by increasing the number of groups of ball bearings.

The contact of the ball bearing 64 with a suitable sensor creates an electrical contact to create a new circuit for channelling an electric current therethrough. Thus, each time a drug-containing tower unit 18 is inserted into a base-port subunit 44 there is generated a particular binary code which is specific to the drug contained with the tower unit.

In an alternative embodiment of the invention encoded information relevant to a particular drug can be supplied by a bar code and a bar code reader customarily employed in the industry.

In a further embodiment of the invention, the drug-containing tower unit contains a device which allows control of the pills passing therethrough. This device can likewise facilitate counting of the individual pills as previously described in connection with the unit 50 contained within the base-port subunit 44.

Figure 10B:
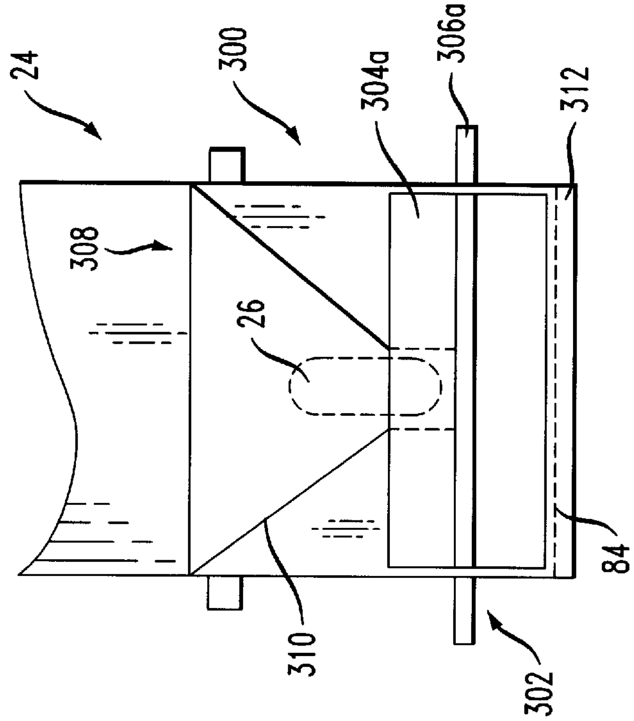
FIG. 10B is a side view of the embodiment of the invention shown in FIG. 10A.
Figure 10A:
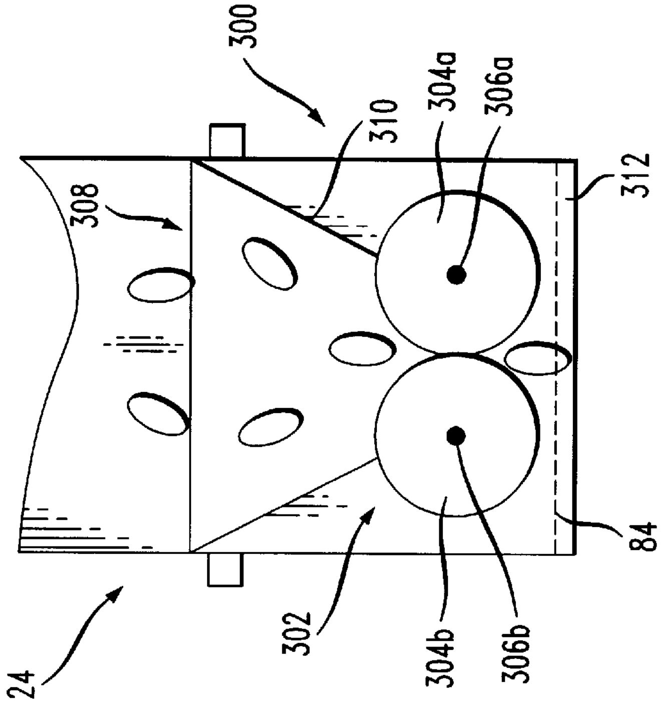
FIG. 10A is a partial front view of the drug-containing tower unit containing a roller assembly for dispensing a drug.

Referring to FIGS. 10A and 10B, there is shown a device 300, within the bottom end 24 of the drug-containing tower unit 18, for controlling the passage of the pills through and out of the drug-containing tower unit 18. In a preferred form of the invention when the drug-containing tower unit 18 is disposable, the device 300 is likewise disposable since it remains with the drug-containing tower unit 18.

The device 300 includes a roller assembly 302 comprised of a pair of opposed rollers 304*a* and 304*b*. The rollers are positioned transverse to the longitudinal axis of the drug-containing tower unit 18 and are juxtaposed so as to allow a single pill 26 to pass therethrough at a time when the rollers are in motion about respective rods 306*a* and 306*b*.

The rollers 304*a* and 304*b* may be made of any material which does not adversely affect the integrity of the pills when they come into contact with and pass through the rollers. Such materials include soft fabrics and plastics. Preferred fabrics include lint-free fabrics such as cotton and weaves of natural or synthetic fibers. Preferred plastics include soft polyurethane foam (Hypol made by W. R. Grace and Scottfoam made by Foamex) and rubbers (e.g. isoprene).

The drug-containing tower unit 18 can also be provided with a device for channeling or directing the pills toward the junction between the rollers 304*a* and 304*b*. As shown in FIGS. 10A and 10B, there is provided a channeling device 308 in the form of a conical shaped conduit 310 which receives pills stored within the drug-containing tower unit 18 and directs them toward the roller assembly 302.

In operation, the pills 26 within the drug-containing tower unit 18 fill the conduit 310. When the rollers 304*a* and 304*b* are in motion, they draw a single pill at a time between the rollers so that the pills sequentially pass through the drug-containing tower unit 18 to the prescription vial as explained hereinafter. In addition, the roller assembly 302 can be operatively connected to a counting device to provide an accurate tabulation of the number of pills which enter the prescription vial as explained hereinafter. Once the precise number of pills is dispensed, the rollers can be made to reverse direction to move any pills within the junction between the rollers back into the conduit 310. The rollers therefore provide a barrier between the conduit and the prescription vial.

Release of the pills 26 in accordance with present invention is readied by the interaction of the drug-containing tower unit 18 and the base-port subunit 44. Release of pills 26 is initiated by the robot arm assembly 68 as described hereinafter. The pills, however, are not released until there is a suitable receptacle to receive the pills in the form of a prescription vial. In accordance with a preferred aspect of the present invention, a prescription vial is positioned directly below the base-port subunit 44, preferably by the robot arm assembly 68 as mentioned previously and as described in detail hereinafter. The pills can be received from the opening in the iris aperture 52 or from the roller assembly 302 as described above.

Figure 11:
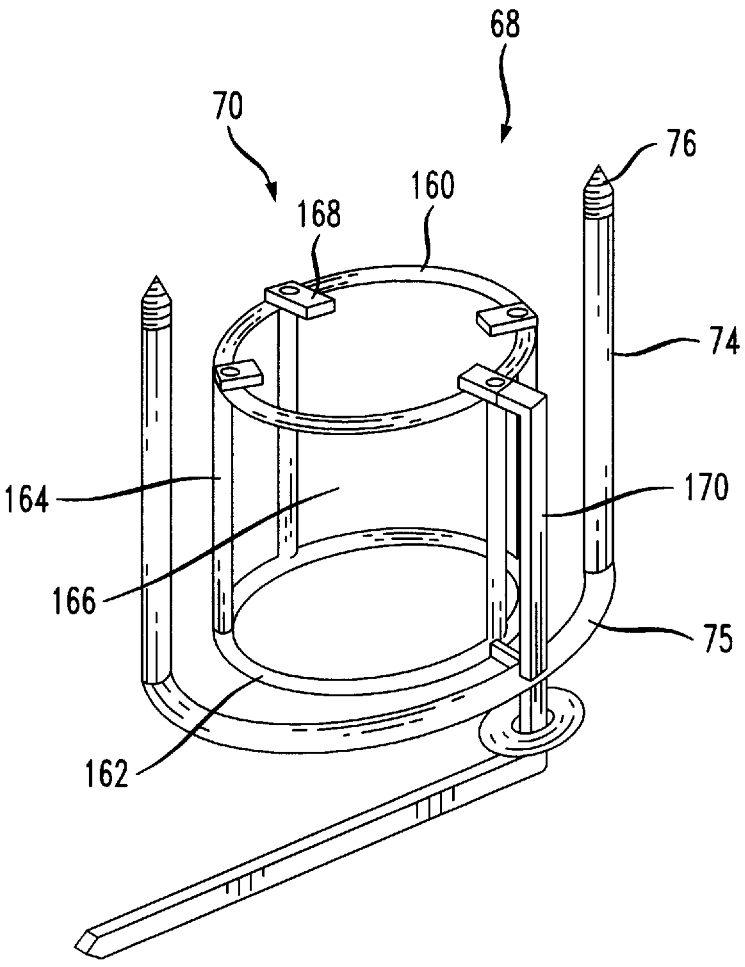
FIG. 11 is a perspective view of an embodiment of a robot arm assembly.

Details of the robot arm assembly are shown in FIG. 11. Referring to FIG. 11, the robot arm assembly 68 includes a housing 70 for securing a suitable prescription vial 72 in place beneath the base-port subunit 44. The housing 70 is connected via a curvilinear arm 75 to opposed flanges 74 having narrowed tips 76 for engaging corresponding indentations in the base-port subunit 44. When the tips 76 are positioned within the indentations, the prescription vial is aligned with and ready to receive the pills 26 contained within the drug-containing tower unit 18. In particular, the flange tip 76 rotates like a drill bit transferring power to a gear system of the base-port subunit 44 originating at a complementary indentation to activate the iris aperture 52 or the roller assembly 302 and dispense pill(s). Pneumatic air pressure or electronics can be used to power this drill bit action. Powering up and drill bit action can be manually or computer controlled.

The robot arm assembly performs the following functions. It obtains a prescription vial, preferably from a prescription vial maker, and delivers the same into position for receiving the pills. In addition, the robot arm assembly assists in capping the prescription vial. Finally, the capped vial containing the desired drug is delivered to an exit way for access of the same by the pharmacist. In carrying out these functions, the robot arm assembly preferably is capable of moving in three dimensions (i.e. along x, y and z coordinates).

Figure 12:
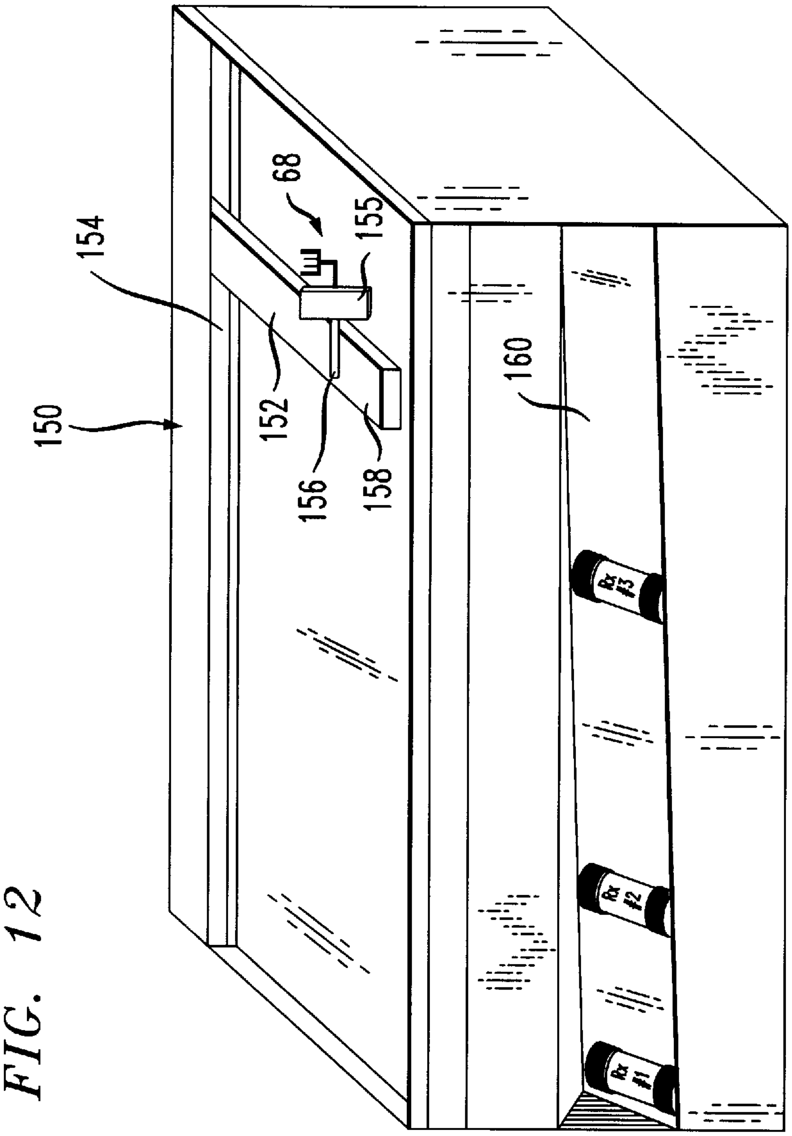
FIG. 12 is a perspective view of the dosage unit system showing the transportation assembly for movement of a robot arm assembly for positioning and delivering the prescription vials.

Referring to FIG. 12, there is shown the robot arm assembly 68 operatively connected to a transportation assembly 150 having a first ramp 152 operatively connected to a second ramp 154. The ramp 152 is adapted to move from left to right (i.e. x-coordinate) as shown in FIG. 9 along the ramp 154. A suitable transportation assembly with three dimensional movement is the CCR-M series of cartesian coordinate robots manufactured by Sankyo Robotics, Boca Raton, Fla.

The robot arm assembly 68 is operatively connected to the ramp 152 through a bar 156 which is provided in a corresponding groove 158 in the ramp 152. As a consequence the robot arm assembly can move from the front of the dosage unit system 2 to the back (i.e. y-coordinate). The robot arm assembly 68 can therefore move to any drug-containing tower unit 18 and deliver the sealed prescription vial to an exitway 160 for delivery to the pharmacist.

The robot arm assembly 68 as shown in FIG. 12 is also enabled to move up and down (i.e. z coordinate) due to its attachment to a vertical ramp 155.

Referring again to FIG. 11, the housing 70 of the robot arm assembly 68 includes opposed rings 160 and 162 secured in spaced apart position by supports 164 thereby defining a storage area 166 for the prescription vial (not shown). Attached to the upper ring 160 is at least one pair (two pair are shown) of flexible gripping tabs 168 which provide pressure on the prescription vial to secure the same within the storage area 166. Rotation of the gripping tabs 168 releases the vial from the housing 70 enabling the vial to be released from the robot arm assembly 68 and descend from the corresponding storage area 166 by gravity through a conduit (not shown) for entry into the exitway 160 shown in FIG. 12.

The housing 70, in one embodiment of the invention, is secured to an arm 75 through a connector 170. The arm 75 is pivotal about the connector 170 to give the robot arm assembly 68, if needed, partial rotational movement to enable the prescription vial to be placed into the operative position for receiving pills from the drug-containing tower unit 18.

Figures 13A, 13B, 13C:
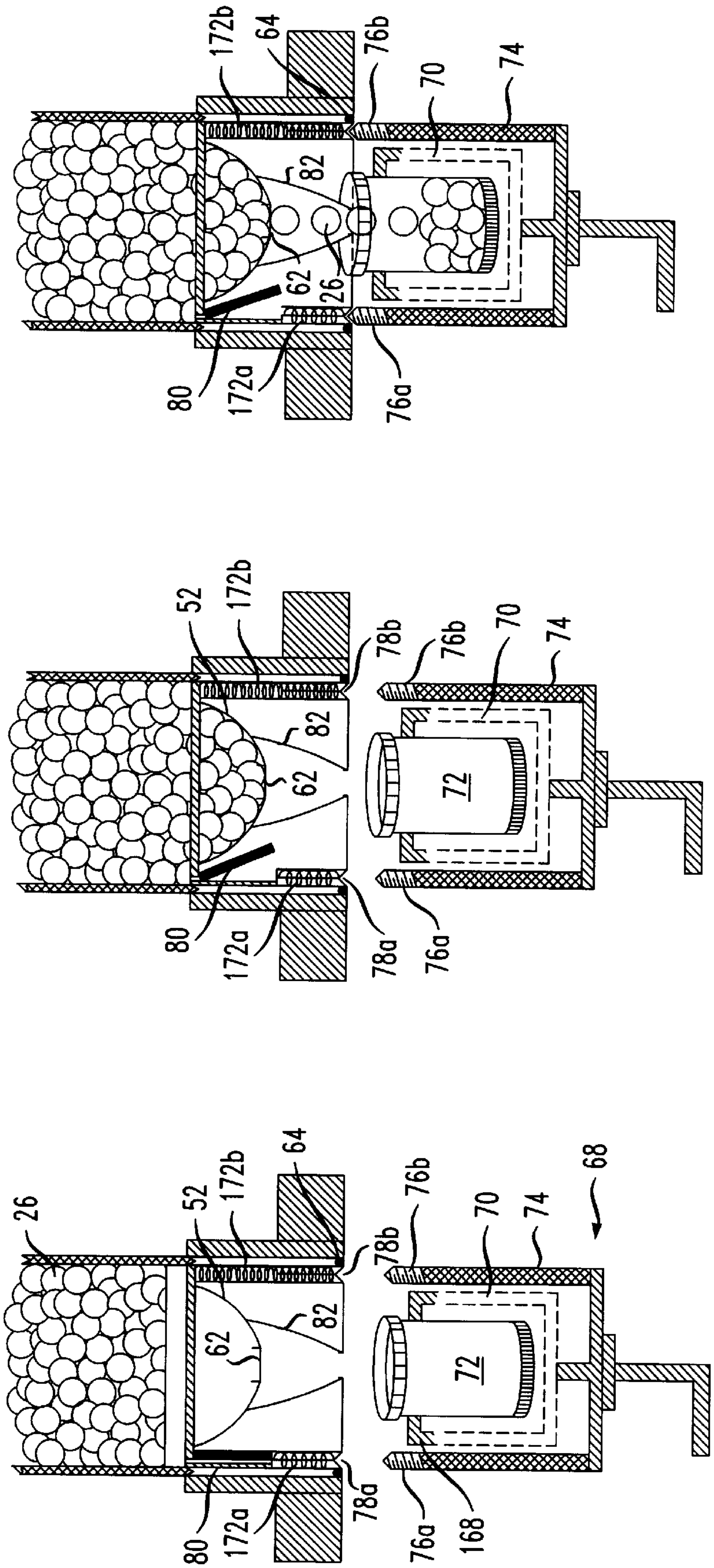
FIGS. 13A–C are cross-sectional side views of the tower unit, base-port subunit and robot arm assembly for the dispensing of a drug into a prescription vial.

In accordance with another preferred embodiment of the present invention, the base-port subunit 44 contains a movable lever 80 which is activated when the tip 76*a* of one of the flanges 74 of the robot arm assembly 68 enters a corresponding indentation 78*a* provided in the base-port subunit 44. As shown in FIGS. 13A–13C, the lever 80 moves inwardly toward the iris aperture 52. The lever 80 may be set at a predetermined range of motion so as to fix the extent to which the leaves 56 move and thereby control the diameter of the opening 62.

When the flange 74 of the robot arm assembly 68 engages the base-port subunit 44 through tip 76*a* and complimentary indentation 78*a*, the flange drives a gear assembly 172*a* which extends the lever 80 to its desirable position (see FIG. 13C) for the particular pills 26 contained within the drug-containing tower unit 18. When the control lever 80 reaches its appropriate position, it is fixed in that position until the drug-containing tower unit 18 is removed. Removal of the drug-containing tower unit 18 resets the control lever 80 to the position shown in FIG. 13A.

In addition, engagement of the flange 74 and the base-port subunit 44 through tip 76*b* and complimentary indentation 78*b*, drives the gear assembly 172*b* which moves the leaves 56 of bowl 54 to provide a funnel arrangement for pills 26 to exit through the opening 62. Pills 26 thus descend with gravity through a tapered conduit 82 and into prescription vial 72 held by the robot arm assembly 68.

As shown in the preferred embodiment of FIGS. 13A–13C, the base-port subunit 44 may be provided with a tapered conduit 82 which controls the movement of the pills 26 from the iris aperture 52 into the prescription vial 72 as will be explained hereinafter. The tapered conduit 82 facilitates the counting of the pills which leave the base-port subunit 44 and enter the prescription vial 72.

Figure 14:
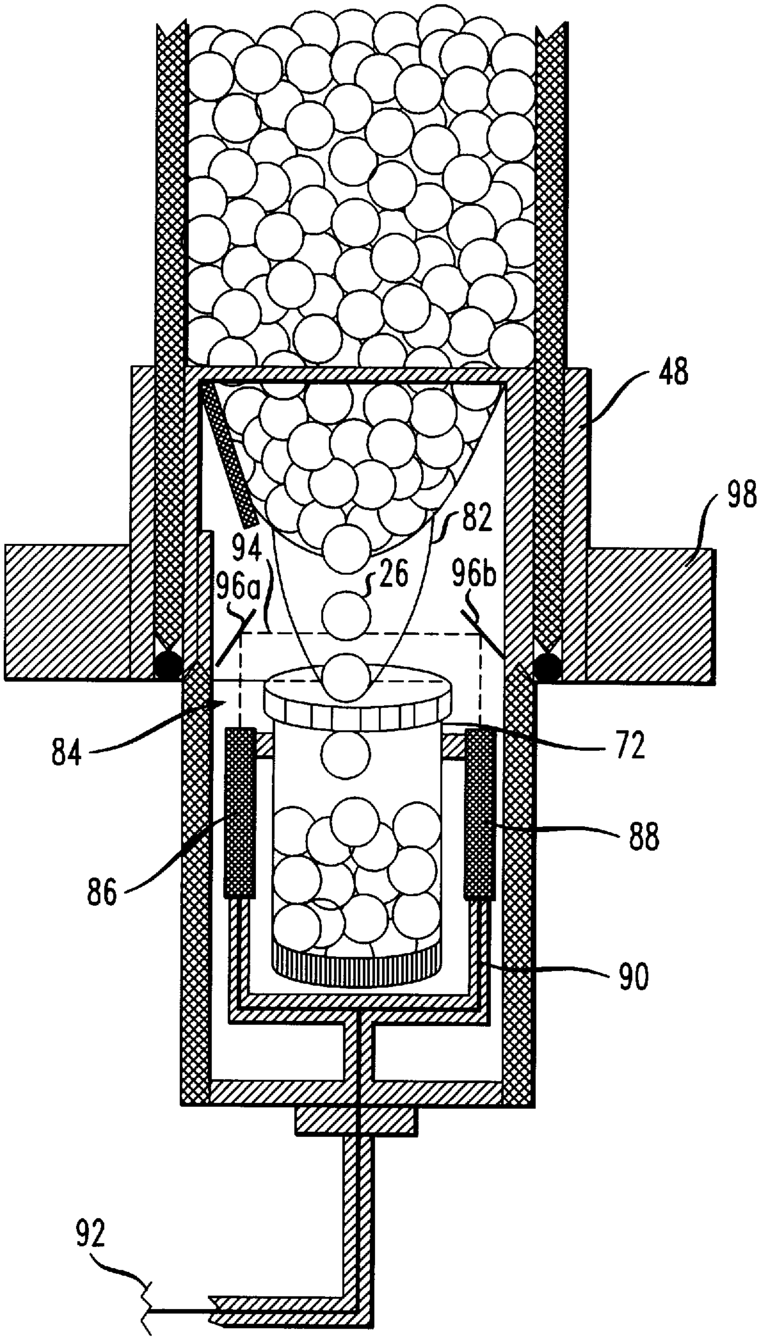
FIG. 14 is a cross-sectional side view similar to FIG. 13C showing an embodiment for counting units of the drug obtained from the drug-containing tower unit.

Each prescription has a finite number of pills that must be dispensed. Detection of the number of pills which have fallen into the prescription vial 72 can be accomplished in a variety of ways. For example, movement of the pills into the prescription vial is detected by a beam which may be optical (e.g. laser, strobe imaging and the like) and/or acoustical, and the like. One such system is shown in FIG. 14. Referring to FIG. 14, there is shown a detection system 84 including a transmitter 86 for transmitting optical or acoustical waves or some other energy form. There is also provided a receiver 88 for receiving the energy form transmitted by the transmitter 86. Both the transmitter 86 and the receiver 88 are connected to an electrical circuit through a circuit switch 90 which is connected to a power source 92 such as a battery or the like.

The path of the energy beam produced by the transmitter 86 runs transverse to the tapered conduit 82 contained within the base-port subunit 44. As shown specifically in FIG. 14, an energy wave 94 travels between a pair of deflectors 96*a* and 96*b* so that the energy wave 94 traverses the tapered conduit 82 between the transmitter 86 and the receiver 88.

In operation, the detection system is turned on which transmits an energy beam 94 between the transmitter 86 and the receiver 88 via the deflectors 96*a* and 96*b*. As each pill 26 passes through the beam, there is a break in the energy wave 94 which is translated into the passage of a single pill into the prescription vial 72 and is recognized by the microprocessor 12.

In another embodiment of the invention, the pills may be counted by employing a pressure sensitive piezoelectric detection surface or sensor device, such as may be provided on the conduit 82 itself or as a tether stranded across the opening of the iris aperture in the path of the falling pills. Each time the surface or tether is struck by a pill there is the generation of an electrical impulse which can be recorded as the passage of a single pill which can be recognized by the microprocessor 12.

The pressure sensitive piezoelectric detection surface is comprised of a flexible material which when deformed by mechanical energy yields a pulse of electric current. Examples of the flexible material include fluorinated polymers such as polyvinylidene fluoride (e.g. Kynar®), and odd-numbered nylons, such as nylon 11.

It will be understood that the systems for detecting the number of pills transferred to the prescription vial can be applied to drug-containing tower units employing the roller assembly 302 as previously described. More specifically the detection system 84, as for example an optical or acoustic wave transmitter or piezoelectric surface can be positioned within the drug-containing tower unit 18. As shown in FIGS. 10A and 10B, the detection system 84 (as represented by dotted lines) is positioned in an area 312 below the roller assembly 302. As each pill passes through the roller assembly, it is detected and therefore tabulated prior to entering the prescription vial. The operation and structure of the detection system 84 in the embodiment of FIGS. 10A and 10B is substantially the same as that described above in connection with the embodiment of FIG. 14.

Figure 15A:
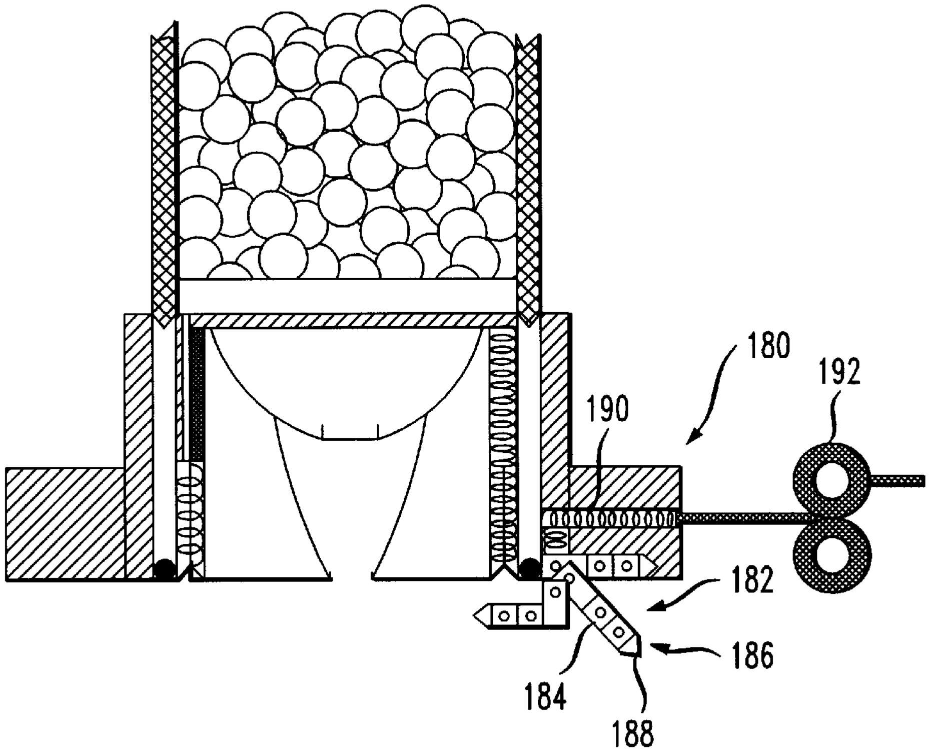
FIGS. 15A and 15B are partial cross-sectional side views of the base-port subunit in the operative position for dispensing units of the drug and a manual assembly for releasing the drug.
Figure 15B:
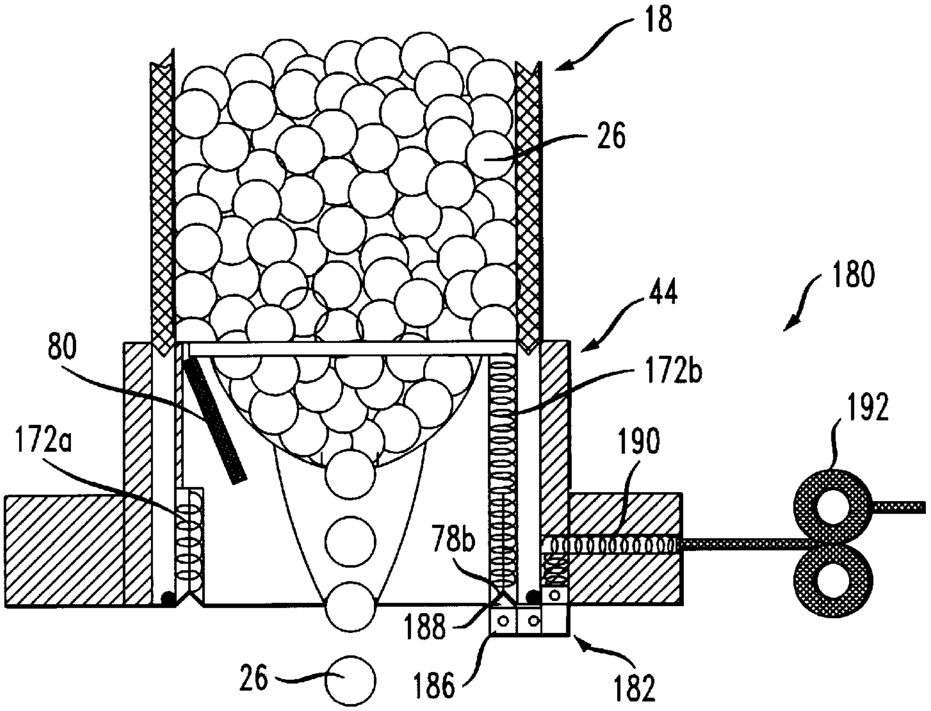

Release of the pills 26 through the defined opening 62 can be conducted automatically through the use of the microprocessor 12 or by mechanical means such as shown in FIGS. 15A and 15B.

Referring first to FIG. 15A there is shown a pill releasing device 180 which relies on mechanical means for releasing the pills 26. The device 180 includes a lever arm 182 comprising a plurality of pivotable units 184 including a terminal unit 186 having a tip 188 adapted to enter the indentation 78*b* and drive the gear assembly 172*b* as previously described in connection with FIGS. 13A–13C.

The lever arm 182 is connected to a gear assembly 190 which in turn is connected to and rendered operational by a hand rotatable crank 192. As shown in FIG. 15A, rotation of the crank 192 actuates the gear assembly 190 which causes the lever arm 182 to move until it is in the position shown in FIG. 15B. Further rotation causes the tip 188 to actuate the gear assembly 172*b* in the base-port subunit 44 thereby moving the leaves 56 of the bowl 54 to provide a funnel arrangement for pills 26 to exit through the defined opening 62 and descend by gravity, thereby releasing pills 26 from the drug-containing tower unit 18.

When the proper number of pills 26 have entered into the prescription vial, the robot arm assembly 68 is disengaged from the base-port subunit 44. This is accomplished by moving the robot arm assembly 68 downwardly by the vertical ramp 155 so that the flanges 74*a* and 74*b* and particularly the tips 76*a* and 76*b* become disengaged from the corresponding indentations 78*a* and 78*b* within the base-port subunit 44. The prescription vial is then moved via the transportation assembly 150 to a capping assembly as explained in detail hereinafter and the robot arm assembly 68 then proceeds to pick up the next prescription vial as required for filling the next prescription.

After the prescription vial is filled with the required number of pills, it is forwarded via the transportation assembly 150 and the robot arm assembly 68 to a capping assembly 200.

Figure 16:
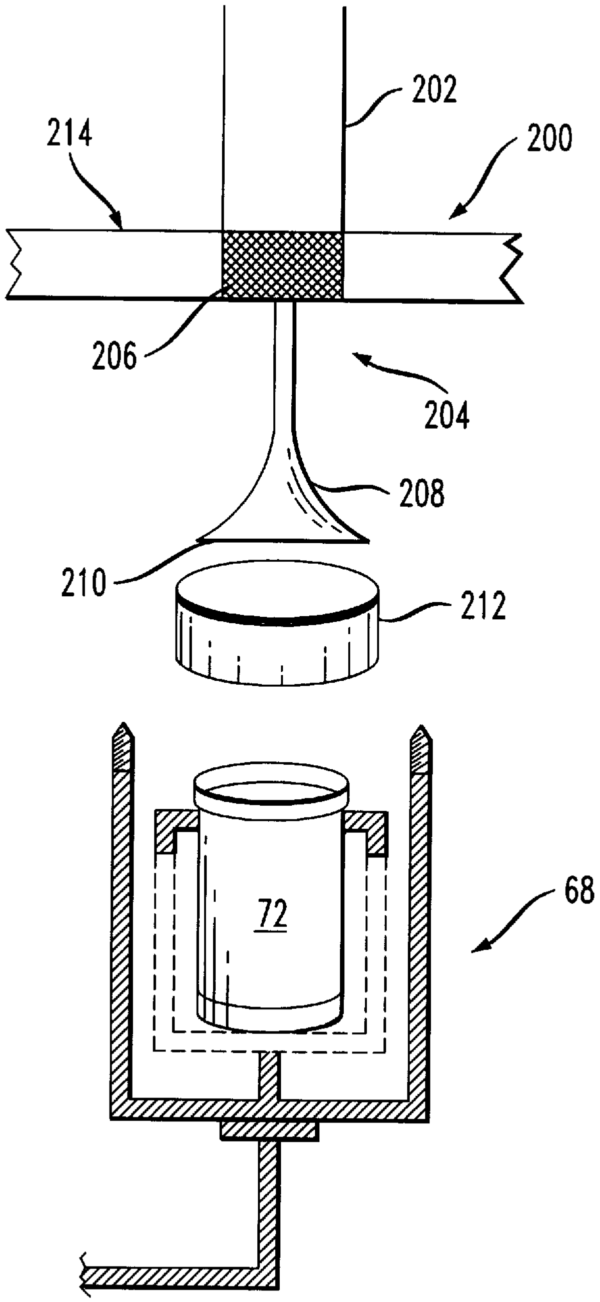
FIG. 16 is a cross-sectional side view of an assembly for capping a prescription vial.

As shown in FIG. 16, an embodiment of a capping assembly 200 includes a tube 202. The tube is constructed so that a cap placing device 204 is movable therein. Movement of the cap placing device 204 is made possible by a pneumatic system (not shown) for creating fluid pressure or suction within the tube 202.

The cap placing device 204 includes a base 206 and a tapered extension 208 having an end 210 adapted to grip a cap 212 by the suction created within the tube 202. When the cap 212 is in place over the prescription vial 72 as shown in FIG. 16 the cap placing device 204 is moved downwardly until the cap 212 snaps on to the top portion of the prescription vial. Adjustments of the position of the cap placing device 204 can be made through the use of a transportation assembly 214 of the same type employed for the robot arm assembly 68.

In accordance with a preferred aspect of the present invention, the prescription dosage unit system 2 provides the means for custom making prescription vials and for delivering the vials in proper position for receiving the proper solid form medication. In a preferred form of the invention, the system for making the prescription vials is contained within the housing 4 of the prescription dosage unit system 2.

Figure 17:
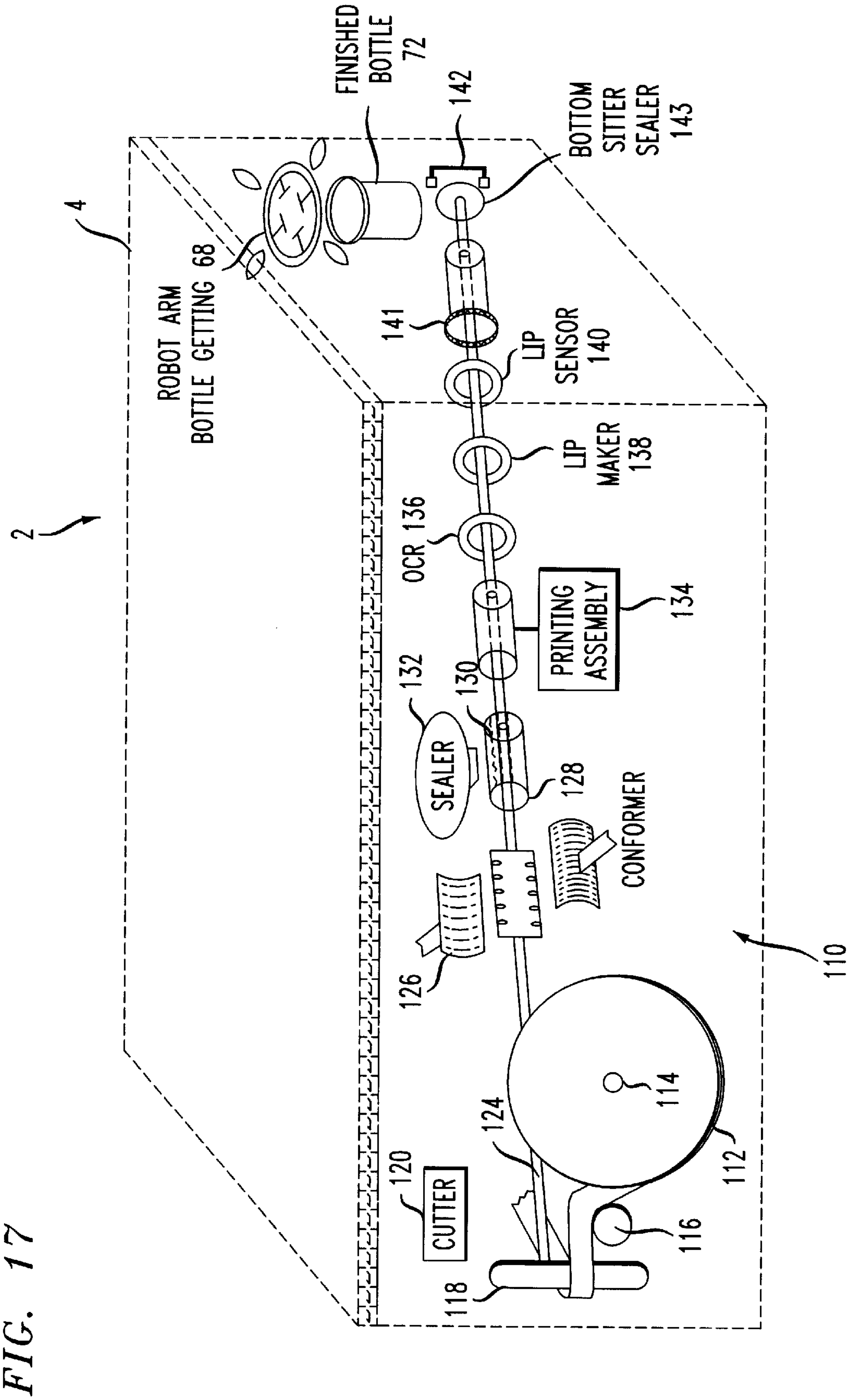
FIG. 17 is a perspective view of the prescription dosage unit system including the prescription vial maker and a device for positioning and securing the vial in place to receive units of the drug from a drug-containing tower unit.
Figure 18:
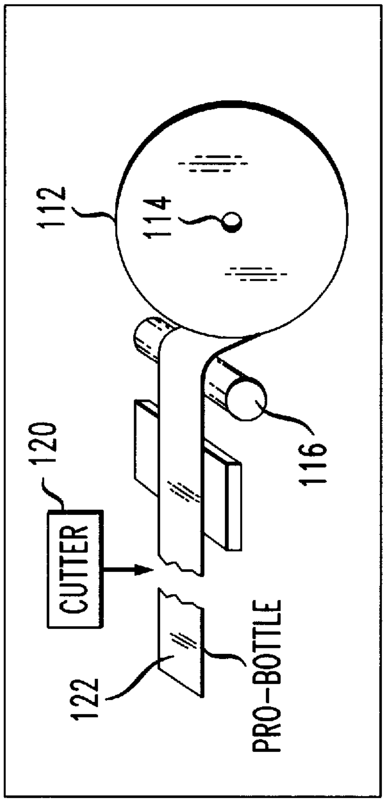
FIG. 18 is a perspective view of the initial operation of making a prescription vial in accordance with the present invention.
Figure 19:
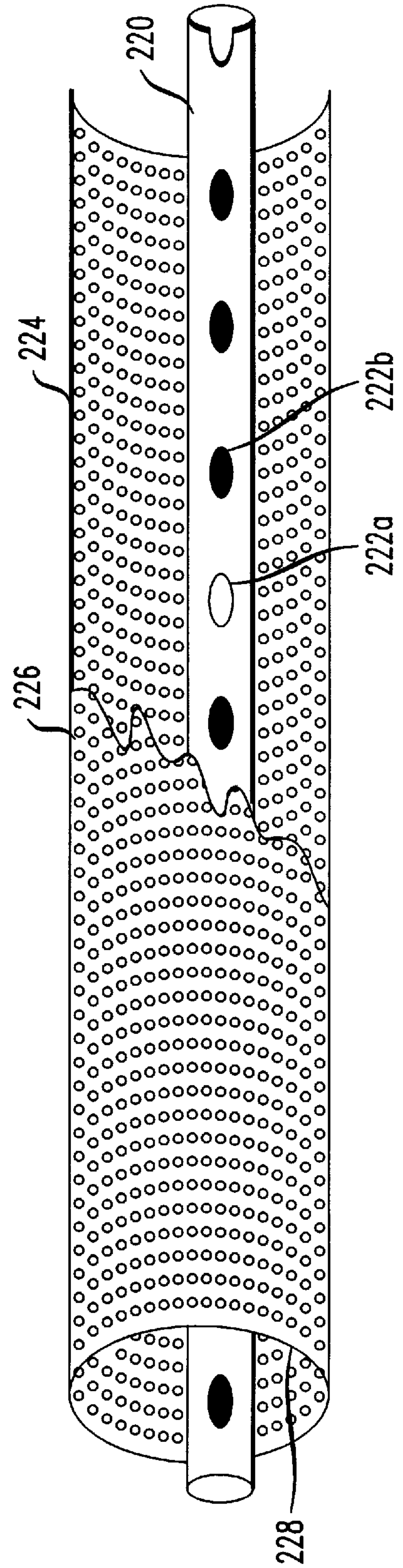
FIG. 19 is a partial cutaway view of a conveyor for passing the prescription vial through the prescription dosage unit system during construction of the same.

Referring to FIGS. 17–19, a prescription vial making assembly 110 is positioned within the housing 4 in the drug delivery section 8 thereof. The prescription vial making assembly 110 includes a source of plastic material 112 in the form of a continuous sheet contained on a roller 114. Directional rollers 116 and 118 are provided to ensure a pathway for the prescription vial under construction so that it ends up in a position to be gripped by the robot arm assembly 68 as previously described.

As the plastic sheet material 112 comes off the roller 114 it is cut by a cutter 120 (see FIG. 18) into a designated length which corresponds to the approximate height of the prescription vial. As shown best in FIG. 18, the cutting operation is performed just after the plastic sheet 112 proceeds over the directional rollers. Once the plastic sheet 112 is cut into a section 122 the sheet passes on a conveyor 124. The first operation on the conveyor 124 is to mold the sheet into a cylinder. As shown in FIG. 17, a conformer 126 having mirror image portions engages the sheet so that it is rolled into the form of a cylinder 128. The edges 130 are sealed by a sealer 132 which typically applies ultrasonic energy to fuse the plastic into a uniform seal. The cylinder 128 then proceeds along the conveyor 124 on a current of air.

As shown best in FIG. 19, the conveyor 124 preferably comprises a tube 220 for receiving a high pressure fluid (e.g. air) and a plurality of slots 222, with some of the slots 222*a* being open and some slots 222*b* closed. Surrounding the tube 220 is a sleeve 224 having therein spaced apart rows of relatively small holes 226. The sleeve 224 is spaced apart from the tube 220 thereby forming a fluid flow region designated by numeral 228.

In operation, a fluid, such as air is blown into the fluid flow region 228 which generates a relatively low pressure therein. Low pressure fluid is forced through the holes 226. High pressure fluid is forced into the tube 220 and escapes through the open slots 222*a*. The sequential opening and closing of the slots 222 thereby creates a sequential array of high fluid pressure regions within the region 228. The high pressure fluid from the region 228 exits through corresponding holes 226 in the sleeve 224. As a result, the cylinder 128 (not shown) is passed on a curtain of fluid over the conveyor 124.

Referring again to FIG. 17, prior to the application of the bottom of the cylinder 128 or the formation of a cap securing lip 141, the just formed cylinder 128 is provided with indicia sufficient for labeling the prescription drug which is to be placed into the prescription vial. For this purpose, there is provided a printing assembly 134 which can directly imprint prescription information onto the cylinder 128 itself or be in the form of a label assembly for imprinting a label and affixing the label onto the cylinder 128. An example of a suitable printing assembly is the Excel series ink jet printers made by Videojet Systems International, Inc.

Because the information provided on the prescription vial is so important, an optional, but preferred, optical character recognition assembly (OCR) 136 maybe provided to optically scan the printed information. The optical scanner 136 can be used to double check the information that has been printed on the label and/or to enter this information into a microprocessor 12 as a cross-check for accuracy and quality. An example of an optical character recognition assembly which can be used in the present invention is the PAC 2000 System made by Videk Corporation.

The cylinder 128 then moves to a device 138 for forming a lip at the upper end of the cylinder to create a sill necessary for the removable engagement of a cap. The cap, of course is applied after the pills have entered the prescription vial. An optical verification recognition (OVR) sensor 140 (e.g. the PAC 2000 System made by Videk Corporation) can check the integrity of the lip or sill. If there is a defective sill or printed indicia the cylinder is rejected. Further along the assembly line, there is provided a bottom sealer 142 which inserts and secures a bottom 143 to the cylinder.

Figure 20:
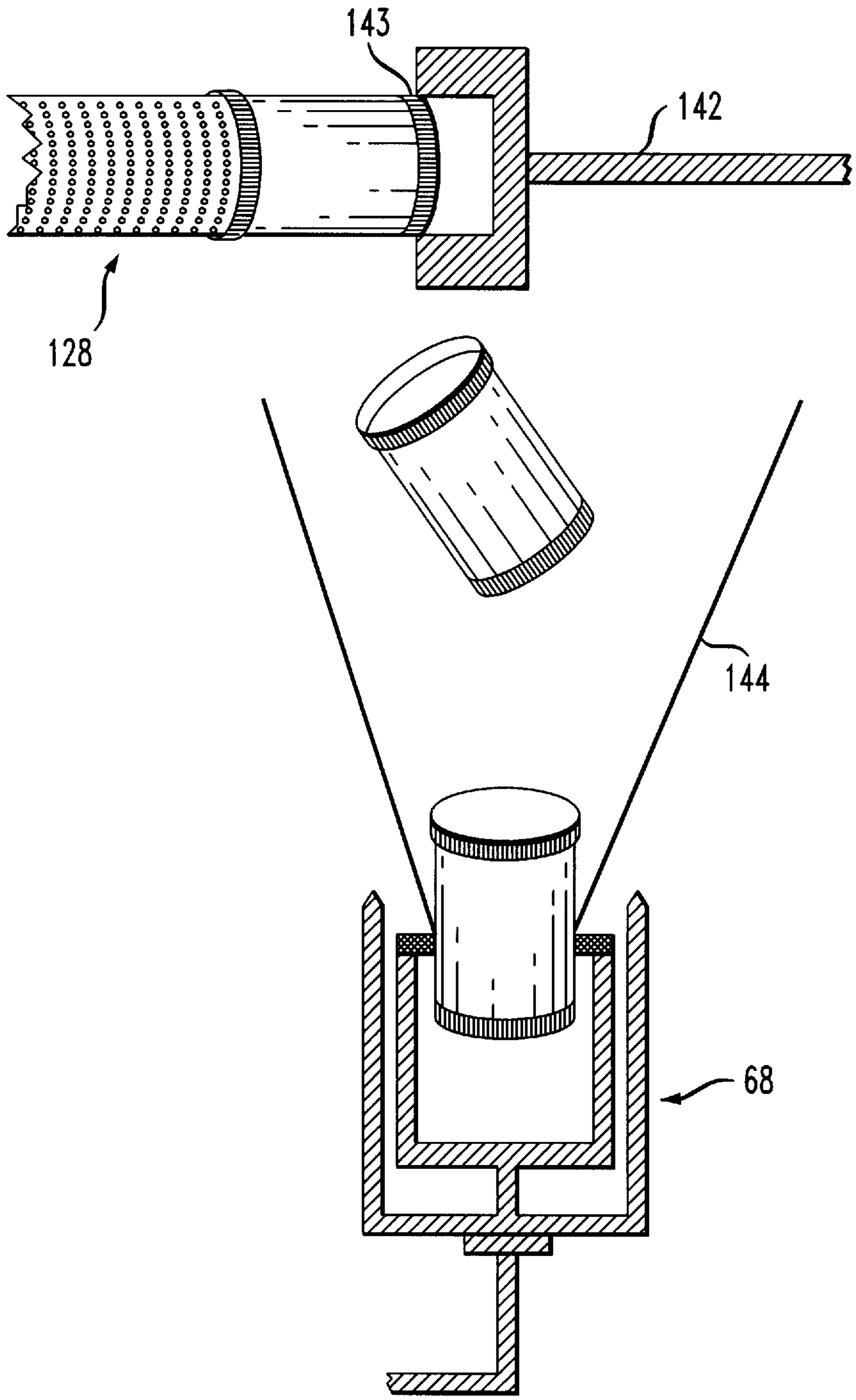
FIG. 20 is a partial perspective view of the terminal end of the prescription vial maker and the release of the completed vial into the robot arm assembly.

There is thus formed a prescription vial having an open top end ready for receiving pills to complete a prescription. The vial in this condition is released from the conveyor 128 and provided to the robot arm assembly 68 through a chute 144 (as shown in FIG. 20) where it is operatively engaged by the robot arm assembly 68 and moved into the proper location directly beneath the drug-containing tower unit 18 containing the proper medication. Once the pills have entered the prescription vial as previously described, the cap 22 is placed thereon by the capping assembly 200 as previously described and illustrated in FIG. 16.

Figure 21:
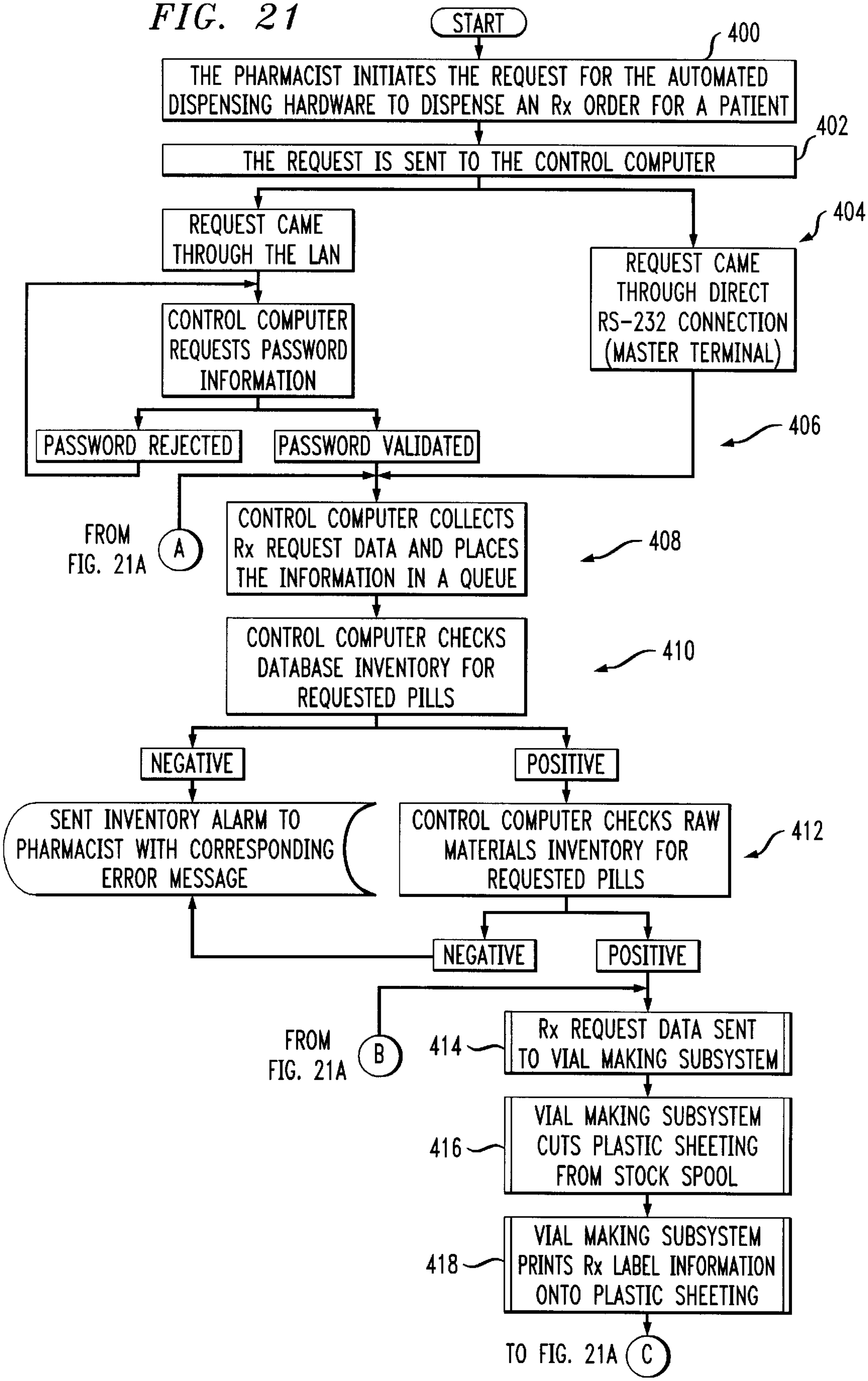
FIG. 21 is a simplified flow diagram illustrating an embodiment of a program which may be employed to operate the drug dispensing system of the present invention.
Figure 21A:
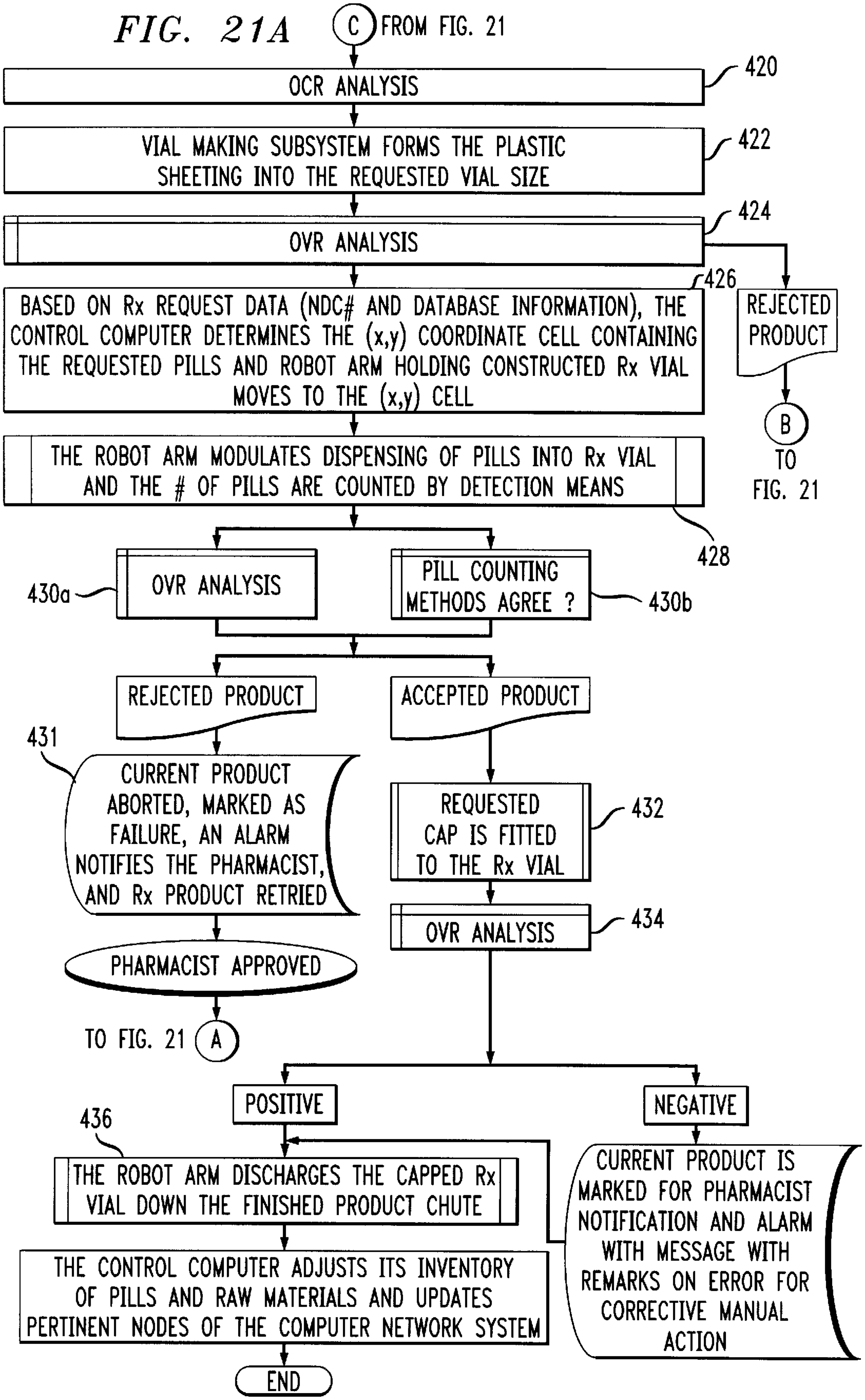

FIG. 21 shows in simplified form an embodiment of the program by which the system of the present invention may be run through the use of a microprocessor 12.

Referring to FIG. 21, the method commences at step 400 where the user initiates the request for the automated dispenser to dispense a prescription order for a patient. In step 402 the request is sent to a control computer which controls the automated dispensing systems hardware. The request may pass through a master terminal or a local area network (LAN) at step 404. After optional validation through a password or the like in step 406, the control computer collects and organizes the prescription request data in step 408.

Thereafter, the control computer checks the database inventory for the requested pills in step 410. If positive, the control computer checks the raw materials inventory for the requested pills in step 412 (i.e. does a drug-containing tower unit contain enough pills to fill the prescription?). If either the check of the database inventory or the check of the raw material inventory is negative, the pharmacist is notified.

If the requisite number of pills is available for filling the prescription, a signal is sent in step 414 to construct a prescription vial (steps 416 and 422), to print a suitable label (step 418), to do an OCR (optical character recognition) analysis on the printed label (step 420) and an OVR (optical verification recognition) analysis (step 424) on the constructed vial. If the vial is rejected after either OCR or OVR analysis, a signal is sent to commence step 414 once again.

Once construction of the prescription vial is complete, step 426 provides for the control computer to determine the specific drug-containing tower unit containing the proper pills and to instruct the robot arm assembly to move to the proper cell of the drug storage section. In step 428, the pills are dispensed into the prescription vial from the specific drug-containing tower unit while being counted by a suitable detection system.

Step 430*a* provides for a double check of the type of pills dispensed into the prescription vial. The preferred method for this step is OVR analysis. Step 430*b* confirms the proper number of pills to fill the prescription. More specifically, the number of pills detected in step 428 is compared with the required number of pills as stored in the computer memory. If both steps are positive, a cap is fitted to the prescription vial and sealing is confirmed in steps 432 and 434, respectively. If the pill count or type of pills is not confirmed, the prescription is rejected and the system recommences operation at step 408 and the user is notified of the rejected prescription in step 431. If OVR analysis of the fitted cap is negative in step 434, the user is notified by an alarm or the like and the product is recapped by the user.

If all is in order, the robot arm assembly discharges the sealed prescription vial in step 436 and stored information (e.g. pill inventory) is adjusted as a result of the dispensing of the particular prescription in step 438.

Modifications of the present system apparent to these of ordinary skill in the art are included within the present invention.

What is claimed:

1. A prescription dosage unit dispensing system comprising:

(a) a housing comprising a plurality of cells, each cell being dimensioned and arranged to receive a base-port subunit;

(b) at least one base-port subunit positioned within a corresponding one of said plurality cells, said base-port subunit being operable to dispense a preselected number of solid dosage units into a vial;

(c) at least one disposable drug-containing tower unit containing, in sealed condition, a single type of solid dosage unit, said at least one tower unit being dimensioned and arranged for releasable engagement with a corresponding base-port subunit and having at one end thereof a defeatable seal, wherein said corresponding base-port subunit is configured to open the defeatable seal upon insertion of a sealed drug-containing tower unit into an associated cell;

(d) a vial production assembly for supplying a vial to be charged by said base-port subunit, said vial production assembly being operative to form a plastic sheet material into a cylinder; and (e) vial transportation means for transporting a vial formed by said vial production assembly through the dispensing system.

2. The system of claim 1 wherein the vial transportation means comprises a robot arm assembly including gripping means for gripping the vial, delivery means for delivering the vial into position to receive the solid dosage units and release means for releasing the vial after the vial has received the preselected number of solid dosage units.

3. The system of claim 2 wherein the robot arm assembly comprises means for engaging the base-port subunit to activate the dosage unit dispensing means.

4. The system of claim 2 wherein the robot arm assembly comprises a pair of parallel spaced-apart rings secured in position by a plurality of supports to thereby define a storage area for the vial and gripping tabs associated with at least one of the rings for securing the vial in place within the storage area.

5. The system of claim 1 wherein the housing comprises a plurality of drawers, each drawer containing a plurality of cells, said drawers being movable into a position so that a desired drug-containing tower unit can dispense the solid dosage units contained therein into a vial.

6. The system of claim 1 wherein the base-port subunit comprises solid dosage unit counting means for counting the number of solid dosage units which enter the vial.

7. The system of claim 6 wherein the counting means comprises a transmitter for transmitting a beam of energy in the path of the solid dosage units after they leave the drug-containing tower unit and a receiver wherein the passage of the solid dosage unit through the beam causes an interruption of the beam indicative of the passage of the solid dosage unit into the vial.

8. The system of claim 6 wherein the counting means comprises a piezoelectric detection surface which when contacted by a solid dosage unit causes a pulse of electric current indicative of the passage of the solid dosage unit into the vial.

9. The system of claim 1 wherein each base-port subunit includes a dosage unit dispensing mechanism comprising a roller assembly positionable within the drug-containing tower unit for releasing the solid dosage unit from the drug-containing tower unit, said roller assembly including a pair of counter-rotating rollers defining therebetween a pathway dimensioned to pass individual solid dosage units during rotation thereof.

10. The system of claim 1 wherein said at least one disposable drug-containing tower unit includes an internal roller assembly comprising a pair of counter-rotating rollers defining therebetween a pathway dimensioned to pass individual solid dosage units during rotation thereof, said system further including drive means operable to engage said counter-rotating rollers upon insertion of a tower unit into a base-port subunit.

11. The system of claim 1 further comprising capping means for placing a cap on the vial after the vial has received the preselected number of solid dosage units.

12. The system of claim 1 further comprising conveyor means for transporting a vial from the vial production assembly to the vial transportation means, said conveyor means comprising a tube and a sleeve concentrically positioned about the tube and means for sequentially generating high pressure air streams for moving the vial on an air layer about the sleeve.

13. The system of claim 1 further comprising indicia on each drug-containing tower unit, said indicia corresponding to at least one characteristic of the solid dosage units contained therein, and said system further including a sensor operative to recognize said indicia and to generate signals representative of said at least one characteristic.

14. The system of claim 13 wherein the indicia comprises an array of projections extending downwardly from the drug-containing tower unit and wherein said sensor includes a plurality of sensing elements, each respective sensing element being engageable with a corresponding one of said projections upon registration of a drug-containing tower unit with a base-port subunit, wherein contact of the projections with the sensors encodes information relating to said at least one characteristic.

15. The system of claim 14 wherein the array of projections and sensing elements define a binary system for encoding said information.

16. The system of claim 13, wherein said at least one characteristic is selected from the group consisting of NDC numbers, lot number, expiration date and contents identification.

17. The system of claim 13 further including a microprocessor unit for receiving and processing said signals generated by the sensor, said microprocessor being further operative, in response to an input request command, to cause an individual base-port subunit to dispense a requested quantity and type of solid dosage unit into a vial.

18. The system of claim 1 wherein each base-port subunit comprises a dosage unit dispensing mechanism operative to transfer a selectable quantity of solid dosage units into a vial.

19. The system of claim 1 wherein each tower unit includes an internal dosage unit dispensing mechanism operative to transfer a selectable quantity of solid dosage units into a vial.

20. A prescription dosage unit dispensing system comprising:

(a) a housing comprising a plurality of cells, each cell being dimensioned and arranged to receive a base-port subunit;

(b) at least one base-port subunit positioned within a corresponding one of said plurality cells;

(c) at least one disposable drug-containing tower unit containing, in sealed condition, a single type of solid dosage unit, said at least one tower unit being dimensioned and arranged for releasable engagement with a corresponding base-port subunit and having indicia thereon corresponding to at least one characteristic of the solid dosage units contained therein;

(d) a sensor operative to recognize said indicia and to generate signals representative of said at least one characteristic subsequent to insertion of said at least one tower unit into said corresponding base-port subunit;

(e) a disposable dosage unit dispensing mechanism positioned within said at least one tower unit;

(f) vial transportation means for transporting a vial through the dispensing system; and (g) a microprocessor unit for receiving and processing signals generated by the sensor, said microprocessor being further operable to locate a tower unit containing a solid dosage unit of a requested type and to cause said dosage unit dispensing mechanism to dispense a selectable quantity of solid dosage units into a vial.

21. The system of claim 20 wherein the microprocessor is operative to at least one of:

(a) determine whether a desired number of dosage units are available to fill a prescription; and (b) cause the vial transportation means to secure a vial containing a filled prescription and to transport the vial to the exitway.

22. The system of claim 20 wherein said at least one characteristic represented by said indicia comprises data relevant to the dispensing of said solid dosage units, the microprocessor being further operative to store and access said data.

23. The system of claim 20 wherein the vial transportation means comprises a robot arm assembly operatively connected to and instructed by the microprocessor means, said robot arm assembly comprising gripping means for gripping the vial, transportation means for transporting the vial into position to receive the solid dosage units and release means for releasing the vial after the vial has received the preselected dosage units.

24. The system of claim 20 wherein said at least one characteristic is selected from the group consisting of NDC numbers, lot number, expiration date and contents identification.

25. A drug-containing tower unit comprising:

a) a tube for storing one type of a solid dosage unit;

b) sealing means for reversibly sealing a bottom end of the tube;

c) engagement means for operatively connecting the tube to a base port subunit of an automated dispensing system;

d) solid dosage unit identification means located at the bottom end of the tube for engaging the base-port subunit to provide data regarding said solid dosage unit, said solid dosage unit identification means including indicia corresponding to at least one characteristic of said one type of solid dosage unit.

26. The tower unit of claim 25 wherein the sealing means comprises a barrier layer formed of aluminum foil or plastic film.

27. The tower unit of claim 26 wherein the plastic film is made of a polymer.

28. The tower unit of claim 25 wherein the said dosage unit identification means comprises an array of projections adapted to engage corresponding sensors in the base-port subunit.

29. The tower unit of claim 25 wherein the engagement for connecting the tube to the base-port subunit is releasable thereby making the tower unit disposable.

30. The tower unit of claim 25 further comprising solid dosage unit dispensing means for dispensing individual solid dosage units.

31. The tower unit of claim 25 further comprising solid dosage unit counting means for counting the number of solid dosage units which leave the tower unit.

32. A method of automatically dispensing a prescription dosage unit through the use of a microprocessor, said method comprising the steps of:

a) recognizing, with a sensor, indicia on a sealed drug-containing tower unit said drug-containing tower unit containing only one type of solid dosage unit and said indicia corresponding to at least one characteristic said type of solid dosage unit;

b) utilizing information obtained during said recognizing step, operating a dispensing mechanism under the control of the microprocessor to transfer a preselected number of solid dosage units from the drug-containing tower unit to a vial; and c) capping the prescription vial.

33. The method of claim 32 further including a step of opening the sealed drug-containing tower unit prior to said operating step.

34. The method of claim 33, wherein said at least one characteristic is selected from the group consisting of NDC numbers, lot number, expiration date and contents identification.

35. A prescription dosage unit dispensing system comprising:

(a) a housing comprising at least one cell dimensioned and arranged to receive a drug-containing tower unit;

(b) a tower unit disposed in each said cell, each tower unit containing a single type of solid dosage unit;

(c) a vial production assembly operative to form a cylindrical vial from a sheet of plastic material having a selectable length; and (d) a controller responsive to an input command requesting a selected quantity of a single type of solid dosage unit for selecting the length of said sheet of plastic material utilized by said vial production assembly, whereby a custom vial having sufficient volume to accommodate the selected quantity of solid dosage unit is formed.

36. The system of claim 35, further including a printer for imparting, on an exterior surface of each custom vial, information relating to a single type of solid dosage unit to be contained therein.

37. The system of claim 35, wherein each said tower unit has indicia thereon corresponding to at least one characteristic of the solid dosage units contained therein, said at least one characteristic being selected from the group consisting of NDC numbers, lot number, expiration date and contents identification, and wherein said system further includes a sensor operative to recognize said indicia and to generate signals representative of said at least one characteristic.

38. The system of claim 37, wherein said controller is further operative to receive and process signals generated by the sensor, said controller selecting a length of sheet for vial formation as a function of the quantity of solid dosage units requested and stored information corresponding to said at least one characteristic.

39. The system of claim 35, further including a dispensing mechanism associated with said tower unit for dispensing solid dosage units of a selected type into a vial formed by said vial production assembly and a vial transporting means for transporting a vial formed by said vial production assembly through the dispensing system, said vial transportation means being operative to secure a vial in place when solid dosage units of a selected single type are dispensed and to transport the solid dosage unit containing vial to a discharge opening of the dispensing system.

40. The system of claim 39, further including a capping mechanism for placing a tight fitting cap over a vial prior to delivery to the discharge opening by said vial transportation means.

41. A method of automatically dispensing a prescription dosage unit through the use of a microprocessor, said method comprising the steps of:

a) inserting a plurality of sealed, disposable drug-containing tower units, each containing only a respective type of solid dosage unit into individual cells of an automated prescription dosage dispenser and having a defeatable seal at the bottom end thereof;

b) opening, during the inserting step, the defeatable seal of each said tower unit;

c) operating, in response to a request to fill a prescription for a particular solid dosage unit, a dispensing mechanism under the control of the microprocessor to transfer a preselected number of said particular solid dosage units from its associated tower-unit to a vial; and d) capping the vial filled during said operating step.

42. A custom vial supplying arrangement for use with a prescription dosage unit dispensing system, said arrangement comprising:

(a) a vial production assembly operative to form a cylindrical vial from a sheet of plastic material having a selectable length; and (b) a controller responsive to an input command requesting a selected quantity of a single type of solid dosage unit for selecting the length of said sheet of plastic material utilized by said vial production assembly, whereby a custom vial having sufficient volume to accommodate the selected quantity of solid dosage unit is formed.

43. The arrangement of claim 42, further including a printer for imparting, on an exterior surface of each custom vial, information relating to a single type of solid dosage unit to be contained therein.

44. The arrangement of claim 42, wherein said controller is further operative to select a length of sheet for vial formation as a function of the quantity of solid dosage units requested and volumetric requirements of said solid dosage units.

45. A method of dispensing prescription dosage units comprising the steps of:

(a) receiving a first request for a quantity of solid dosage unit of a single type;

(b) selecting, in a first selecting step, a first section of plastic sheet material having a length sufficient to form a cylindrical vial of sufficient volume to accommodate the quantity of solid dosage unit requested;

(c) forming a vial from said first section of plastic material;

(d) charging the vial formed during said forming step with said quantity of solid dosage unit;

(e) receiving a second request for a quantity of solid dosage unit of a single type, at least one of the quantity and the type of dosage unit being different from that requested in said first request;

(f) selecting, in a second selecting step, a second section of plastic sheet material having a length different from that selected in said first selecting step, said second section being of sufficient length to form a cylindrical vial of sufficient volume to accommodate the quantity and type of solid dosage unit requested in said second request;

(g) forming, in a second forming step, a vial from said second section of plastic material; and (h) charging the vial formed during said second forming step with the quantity and type of solid dosage unit requested in said second request.

* * * * *